United States Patent
Sakai et al.

(10) Patent No.: US 6,876,299 B2
(45) Date of Patent: Apr. 5, 2005

(54) OCCUPANT DETERMINING DEVICE

(75) Inventors: Morio Sakai, Toyota (JP); Masaki Mori, Kariya (JP); Koji Aoki, Nagoya (JP); Minoru Izawa, Okazaki (JP); Yasunori Hasegawa, Kasugai (JP); Takaai Enomoto, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 61 days.

(21) Appl. No.: 10/623,622

(22) Filed: Jul. 22, 2003

(65) Prior Publication Data
US 2004/0135697 A1 Jul. 15, 2004

(30) Foreign Application Priority Data
Jul. 22, 2002 (JP) ........................................ 2002-212403

(51) Int. Cl.⁷ .................................................. B60Q 1/00
(52) U.S. Cl. .................... 340/436; 280/735; 340/457.1; 701/45
(58) Field of Search ................................. 340/436, 438, 340/425.5, 426.24, 426.26, 457.1; 280/734, 735; 701/45; 180/271; 73/862.391, 862.08, 862.322, 862.37, 862.581, 862.584

(56) References Cited
U.S. PATENT DOCUMENTS 5,877,677 A * 3/1999 Fleming et al. ............. 340/436
6,364,352 B1 * 4/2002 Norton ........................ 280/735
6,428,039 B1 * 8/2002 Pramler ...................... 280/735
6,536,797 B1 * 3/2003 Reich .......................... 280/735
6,735,508 B2 * 5/2004 Winkler ........................ 701/45
6,748,814 B2 * 6/2004 Ishida et al. ............ 73/862.391
6,764,095 B2 * 7/2004 Stephan et al. ............. 280/735

FOREIGN PATENT DOCUMENTS

JP          9-207638 A        8/1997

* cited by examiner

Primary Examiner—Brent A. Swarthout
(74) Attorney, Agent, or Firm—Burns, Doane, Swecker & Mathis, L.L.P.

(57) ABSTRACT

An occupant determining device includes a load detecting sensor provided on a seat body and a controller. The controller calculates a detected load value based on an output value of the load detecting sensor and performs occupant determination based on the detected load value. The occupant determination state is switched to an adult determination state when a certain delaying time elapses after the detected load value exceeds a first determination threshold. The controller sets the delaying time shorter when the detected load value exceeds the first determination threshold within a predetermined time after the detected load value exceeds a second determination threshold.

4 Claims, 5 Drawing Sheets

OCCUPANT DETERMINING DEVICE

CROSS REFERENCE TO RELATED APPLICATIONS

The application is based on and claims priority under 35 U.S.C. § 119 with respect to a Japanese Patent Application 2002-212403 filed on Jul. 22, 2002, the entire content of which is incorporated herein by reference.

FIELD OF THE INVENTION

This invention generally relates to an occupant determining device. More particularly, this invention pertains to an occupant determining device which performs occupant determination based on a load detection value detected by a load detecting sensor provided at a seat.

BACKGROUND OF THE INVENTION

Generally, when an air bag device, which is one of a safety device, is provided in a vehicle for ensuring an occupant sitting on a seat from a traffic accident, an occupant determining device is provided at the seat in order to determine whether or, not an occupant sitting on the seat exists, or whether an occupant sitting on the seat is, for example, an adult or the occupant is a child. For example, a known occupant determining device is disclosed in a Japanese Patent Laid-open Publication No.9 (1997)-207638. This occupant determining device has plural load detecting sensors and a controller. The plural load detecting sensors are respectively provided on mounting portions for mounting a seat to a vehicle floor. The controller calculates a load detection value based on detected values of each load detecting sensor and then determines whether or not an occupant sitting on the seat exists. More specifically, the controller initially calculates the load detection value by summing the detected values from each load detecting sensor by an adder, and then a determination transaction circuit being provided in the controller compares the load detection value with a predetermined threshold (a determination threshold). The controller determines whether or not the occupant sitting on the seat exists based on the foregoing compared result.

In the occupant determining device described above, load being applied to the load detecting sensor varies due to swinging or posture variation of the occupant sitting on the seat under a traveling vehicle. Thus, in order to prevent frequent switching of an occupant determination state by temporary load variation, a low-pass filter is applied to signals transmitted from the load detecting sensors, or delaying transaction is applied at the switching of the occupant determination state by a magnitude relation, between the load detection value and the determination threshold. Then the temporary switching of the occupant determination state (for example, from a state corresponding to "adult" to a state corresponding to "child"), which is generated by the swinging or the posture variation of the occupant, is prevented.

In the foregoing occupant determining device, for example when the occupant gets in a vehicle or when the occupant is switched, the delaying transaction is similarly applied to the switching of the occupant determination state. However, even if the occupant apparently corresponds to the "adult" by judging from significant increase of the load detection value as the occupant gets in or switched, the occupant determination state cannot be immediately switched to the "adult" due to the delaying transaction.

The present invention therefore seeks to provide an occupant determining device capable of determining immediately that an occupant sitting on a seat corresponds to "adult" when the occupant sits on or switched.

SUMMARY OF THE INVENTION

According to an aspect of the present invention, an occupant determining device includes a load detecting sensor provided on a seat body, and a controller. The controller calculates a detected load value based on an output value of the load detecting sensor and performs occupant determination based on the detected load value. The occupant determination state is switched to an adult determination state when a certain delaying time elapses after the detected load value exceeds a first determination threshold. The controller sets the delaying time shorter when the detected load value exceeds the first determination threshold within a predetermined time after the detected load value exceeds a second determination threshold.

According to another aspect of the present invention, a first delaying time and a second delaying time being shorter than the first delaying time are provided as the delaying time. The controller sets the first delaying time as the delaying time when the detected load value exceeds the first determination threshold after elapsing of the predetermined time under the detected load value exceeding the second determination threshold. The controller sets the second delaying time as the delaying time when the detected load value exceeds the first determination threshold within the predetermined time after the detected load value exceeds the second determination threshold.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Hereinafter, an embodiment of the present invention applied to a vehicle seat is described in sequence with reference to FIGS. 1–8.

Figure 1:
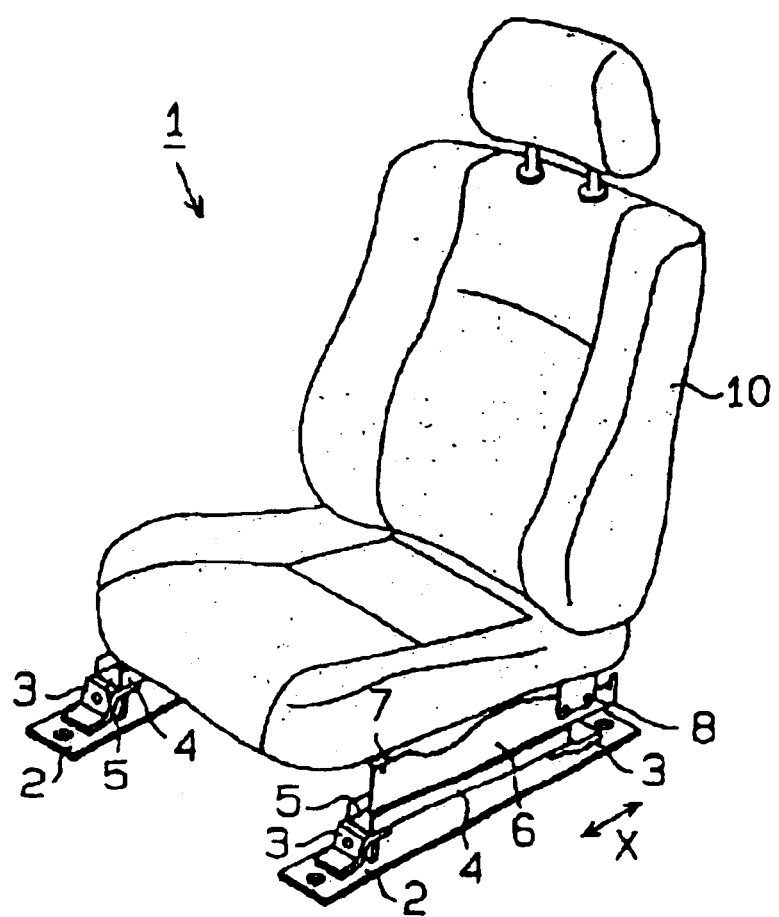
FIG. 1 is a perspective view of a seat according to an embodiment of the present invention.

As shown in FIG. 1, a seat body 1 according to an embodiment of the present invention is provided, for example, as a passenger seat of a vehicle. A pair of supporting frames 2 is fixed to a vehicle floor (not shown) so as to extend in a longitudinal direction of the vehicle ("X" arrow shown in FIG. 1). The seat body 1 is mounted on the vehicle floor through the pair of supporting frames 2.

A pair of brackets 3 is fixed to each supporting frame 2 on front and rear portions thereof, and a lower rail 4 is fixed to the pair of the brackets 3 along the supporting frame 2. The lower rail 4 has an approximately U-shaped cross section with an upward opening. The opening extending in the longitudinal direction of the vehicle forms a slide groove 5.

Figure 2:
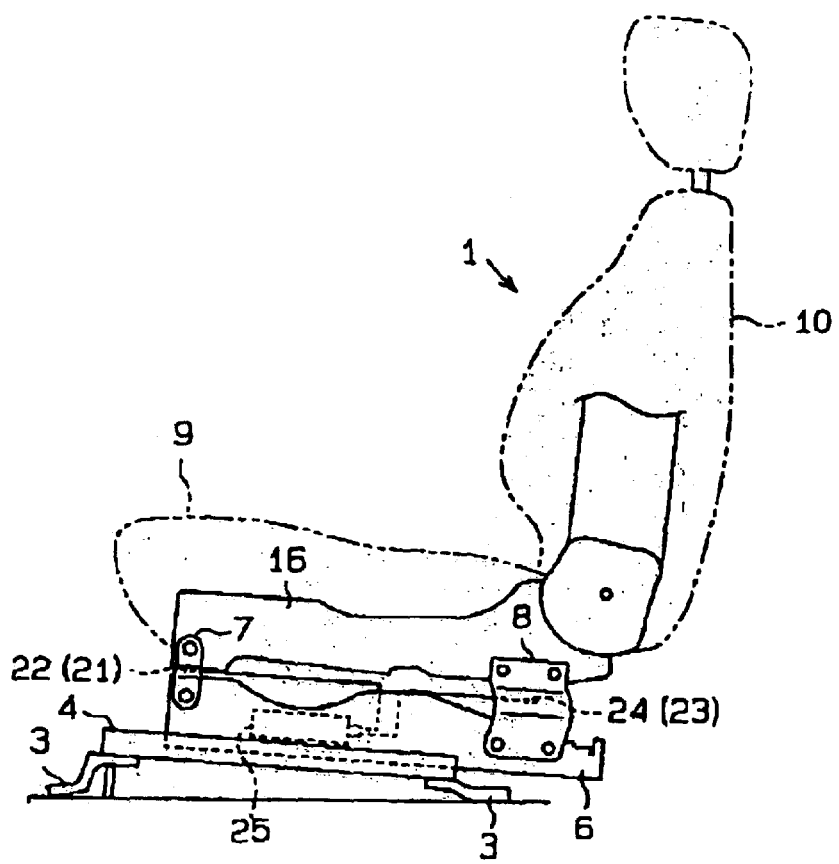
FIG. 2 is a lateral view of the seat shown in FIG. 1.

A pair of upper rails 6 is accommodated in the slide grooves 5 of the lower rails 4 so as to be slidably movable in the longitudinal direction of the vehicle in the slide grooves 5. As shown in FIG. 2, each upper rail 6 has a front sensor bracket 7 and a rear sensor bracket 8. A pair of lower arms 16, which supports a seat cushion 9 and a seat back 10, is connected to the pair of upper rails 6 by using the front sensor brackets 7 and the rear sensor brackets 8.

Figure 3A:
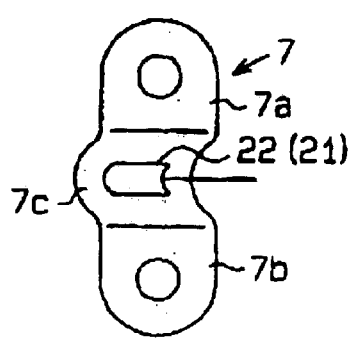
FIG. 3(a) is a perspective view of a front sensor bracket provided on lateral sides of the seat shown in FIG. 1.

As shown in FIG. 3(a), each front sensor bracket 7 is provided with an upper fastening portion 7a and a lower fastening portion 7b. Further, a flexible portion 7c, which has a curved shape and located between the upper fastening portion 7a and the lower fastening portion 7b, is provided on the front sensor bracket 7. The upper fastening portion 7a and the lower fastening portion 7b are respectively fixed to a front side of the lower arm 16 and a front side of the upper rail 6. The flexible portion 7c of each front sensor bracket 7 is provided with a load detecting sensor, that is a front right-hand side sensor 21 (hereinafter referred to as a load detecting sensor 21) and a front left-hand side sensor 22 (hereinafter referred to as a load detecting sensor 22). These load detecting sensors 21 and 22 include for example, a strain detecting element such as a strain gauge. Thus, the load detecting sensors 21 and 22 can detect a flexible amount of the flexible portion 7c in response to load applied to the seat cushion 9.

Figure 3B:
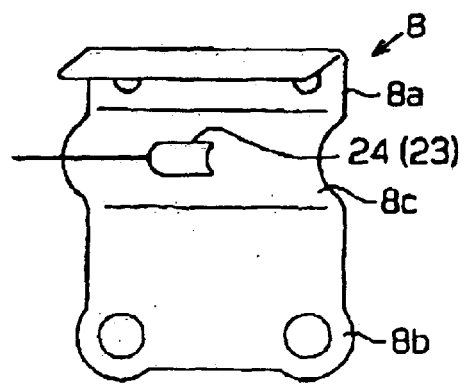
FIG. 3(b) is a perspective view of a rear sensor bracket provided on lateral sides of the seat shown in FIG. 1.

On one hand, as shown in FIG. 3(b), each rear sensor bracket 8 is also provided with an upper fastening portion 8a and a lower fastening portion 8b as same with the front sensor bracket 7. A flexible portion 8c, which has a curved shape and located between the upper fastening portion 8a and the lower fastening portion 8b, is provided on the rear sensor bracket 8. The upper fastening portion 8a and the lower fastening portion 8b are respectively fixed to a rear side of the lower arm 16 and a rear side of the upper rail 6. The flexible portion 8c of each rear sensor bracket 8 is provided with a load detecting sensor, that is a rear right-hand side sensor 23 (hereinafter referred to as a load detecting sensor 23) and a rear left-hand side sensor 24 (hereinafter referred to as a load detecting sensor 24). These load detecting sensors 23 and 24 include the strain detecting element such as the strain gauge as same with the load detecting sensors 21 and 22. The load detecting sensors 23 and 24 can detect a flexible amount of the flexible portion 8c in response to load applied to the seat cushion 9.

Figure 4:
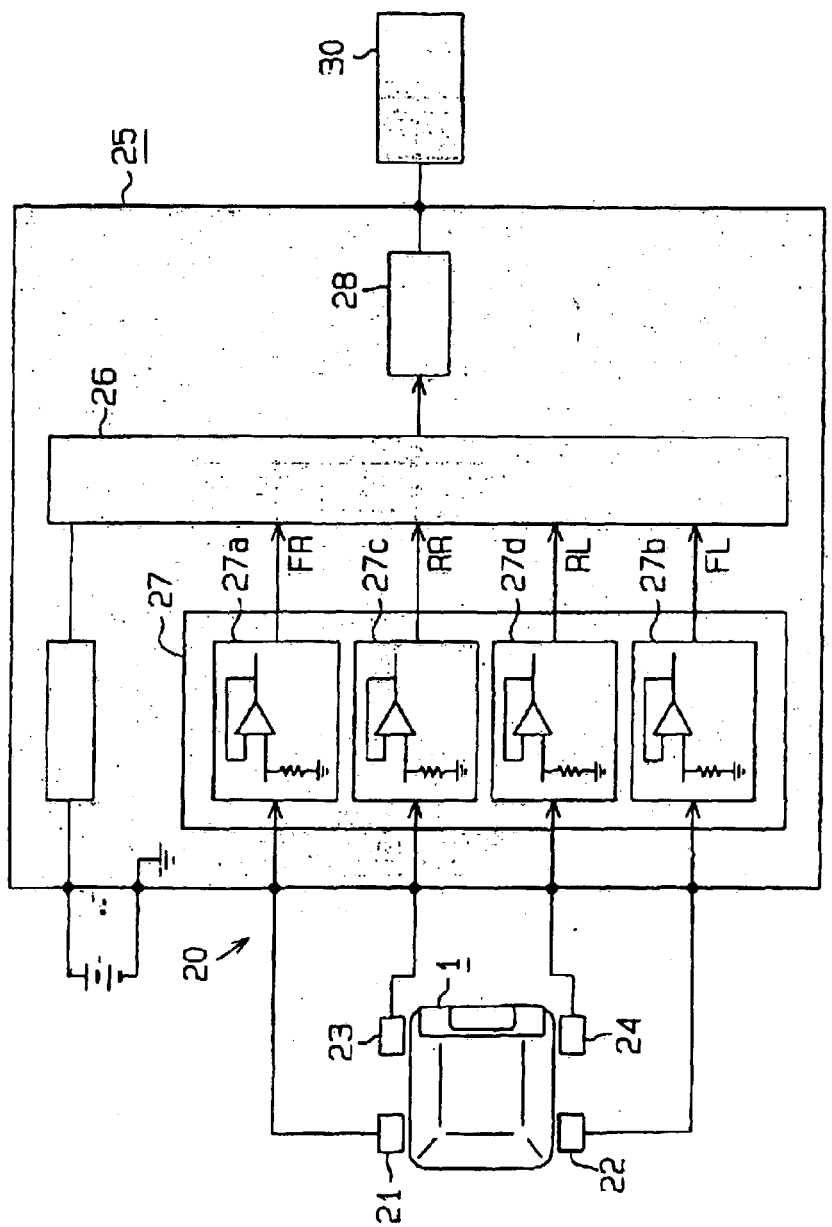
FIG. 4 is a block diagram showing an electric structure of an occupant determining device according to the embodiment of the present invention.

FIG. 4 is a block diagram showing an electric structure of an occupant determining device 20 provided at the seat body 1. The occupant determining device 20 includes the load detecting sensors 21–24 and a controller 25.

The controller 25 has CPU 26, a sensor signal input circuit 27, and an output circuit 28 therein. The sensor signal input circuit 27 has active filters 27a, 27b, 27c, and 27d corresponding to the load detecting sensors 21–24 respectively.

Load signals detected by the load detecting sensors 21–24 are inputted to the CPU 26 through the active filters 27a–27d. The active filters 27a–27d, which includes passive elements such as condensers and resistances combined with active elements such as an amplifier, are well-known low-pass filters. Among the load signals detected by the load detecting sensors 21–24, only the load signals with lower frequency can pass through the active filters 27a–27d, and residual load signals are cut off.

Based on the load signals from the load detecting sensors 21 and 22 passing through the active filters 27a and 27b respectively, an output value FR of the load detecting sensor 21, and an output value FL of the load detecting sensor 22 are calculated by the CPU 26, Correspondingly, an output value RR of the load detecting sensor 23 and an output value RL of the load detecting sensor 24 are calculated by the CPU 26 based on the load signals from the load detecting sensors 23 and 24 passing through the active filters 27c and 27d respectively. A load detection value (a detected load-value) Ws is calculated by the sum of the output values FR, FL, RR, and RL.

The CPU 26 performs a series of calculation based on a predetermined control program and an initial data memorized therein. Then the CPU 26 outputs a calculation result or an occupant determination result to the output circuit 28. The calculation result is inputted to an air bag controller 30 through the output circuit 28, then operation of an air bag device or for example, an inflating amount of the air bag is controlled.

Next, transaction of occupant determination in the embodiment will be explained below with reference to time charts shown in FIGS. 5–8. The CPU 26 determines a type of the occupant ("adult", "child", "occupant-being" or "no-occupant") based on the load detection value Ws. In the process of the occupant determination, the CPU 26 performs clocking for delaying transaction at switching of an occupant determination state by a built-in timer.

Figure 5:
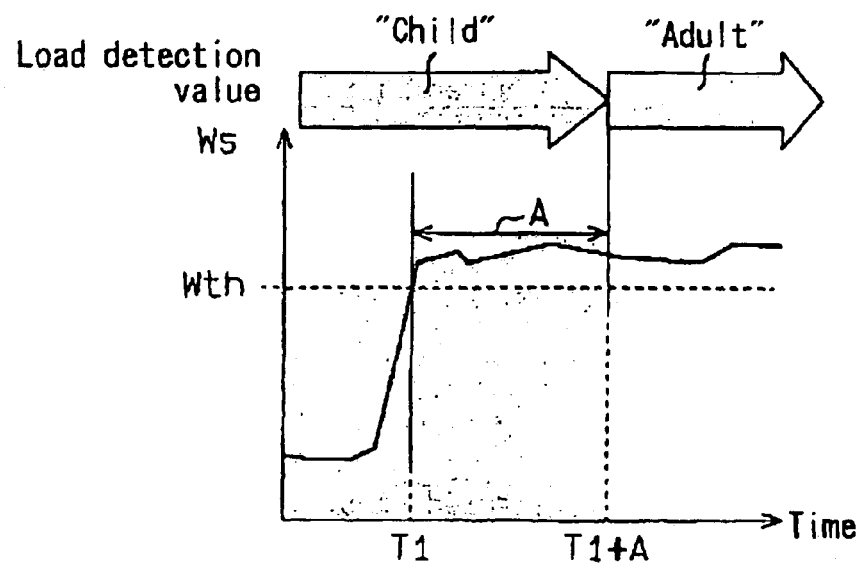
FIG. 5 is one of time charts describing occupant determination performed in the embodiment of the present invention.
Figure 6:
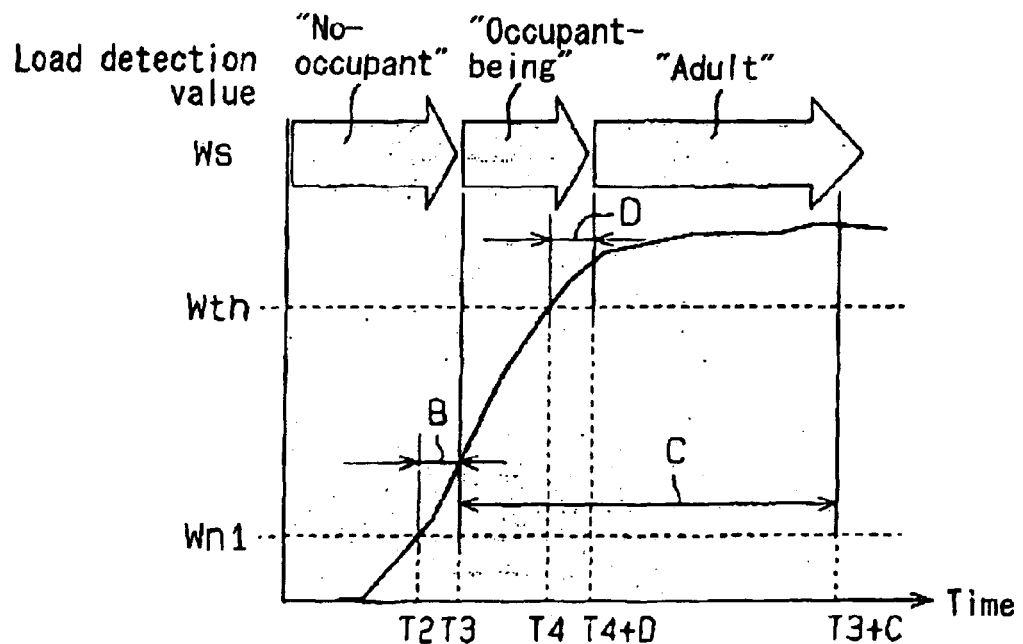
FIG. 6 is one of the time charts describing the occupant determination performed in the embodiment of the present invention.
Figure 7:
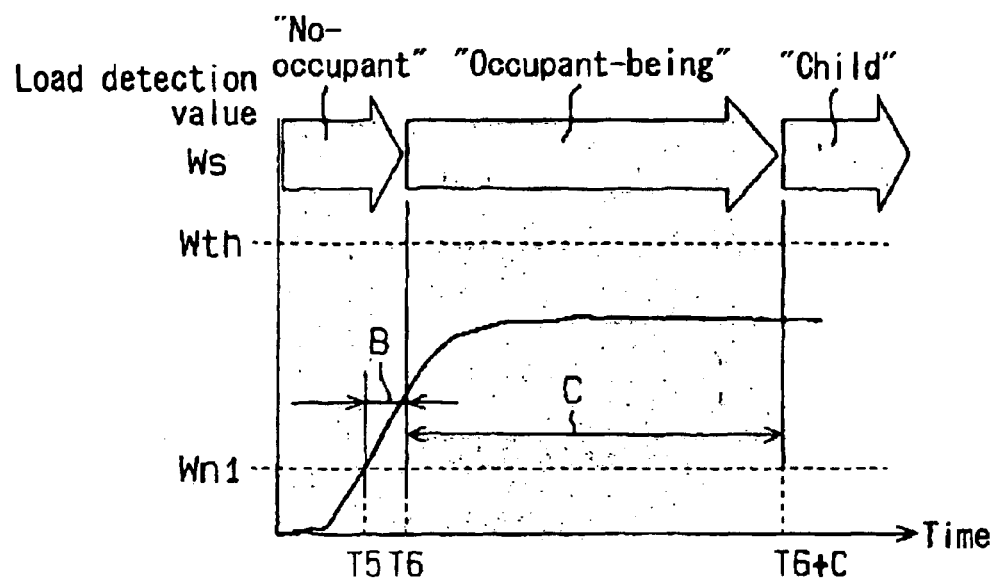
FIG. 7 is one of the time charts describing the occupant determination performed in the embodiment of the present invention.

In FIGS. 5–7, a determination threshold Wth as a first determination threshold is a predetermined threshold being set in order to determine the occupant determination state corresponding to the "adult" (an adult determination state). The determination threshold Wth is set suitable for determining the "adult" by being compared with the load detection value Ws. A determination threshold Wn1 as a second determination threshold is set in order to determine that the occupant including the "child" exists (an occupant-being determination state). A determination threshold Wn2 is set in order to determine that the occupant does not exist (a no-occupant determination state). The determination threshold Wn2 is set smaller than the determination threshold Wn1 so that the occupant determination state cannot be easily switched to the "no-occupant" under the influence of posture variation of the occupant. These determination thresholds Wn1 and Wn2 are set suitable value for respectively determining that the occupant including the "child" exists and that the occupant does not exist.

In FIG. 5, transition of the occupant determination will be explained as the occupant determination state corresponds to the "child" (a child determination state) under the load detection value Ws being smaller than the determination threshold Wth. This "child" state is generated when the occupant determination state corresponding to the "child" is fixed after the load detection value Ws decreases by the posture variation of the occupant. Of course, when the occupant determination state corresponds to the "no-occupant" under the load detection value Ws being sufficiently small, transition of the occupant determination under the "no-occupant" state is similar to the transition under the "child" state. Therefore, explanation concerning the "no-occupant" state is omitted.

In FIG. 5, when the load detection value Ws exceeds the determination threshold Wth at time "T1", the CPU 26 starts clocking of elapsing time under the load detection value Ws being the determination threshold Wth or more. When the elapsing time exceeds a first predetermined time A (a certain delaying time) as, a first delaying time, the CPU 26 switches the occupant determination state from the "child" to the "adult". The first predetermined time A is applied to delaying transaction corresponding to the determination threshold Wth. The first predetermined time A is set to be relatively long time in order to prevent temporary switching of the occupant determination state from the "child" to the "adult" by swinging or posture variation of the occupant. Then the occupant determination state being the "adult" continues after elapsing of the first predetermined time A from the time "T1".

On one hand, in FIG. 6 and FIG. 7, transition of the occupant determination will be explained as the occupant determination state corresponds to the "no-occupant" under the load detection value Ws being smaller than the determination threshold Wn1. This "no-occupant" determination state is generated when the occupant determination state corresponding to the "no-occupant" is fixed after the load detection value Ws significantly decreases.

In FIG. 6, when the load detection value Ws exceeds the determination threshold Wn1 at time "T2", the CPU 26 starts clocking of elapsing time under the load detection value Ws being the determination threshold Wn1 or more. When the elapsing time exceeds a predetermined time B, the CPU 26 switches the occupant determination state from the "no-occupant" to the "occupant-being" at time "T3" (=T2+B). The predetermined time B is applied to delaying transaction corresponding to the determination threshold Wn1. The predetermined time B is set to be suitable time which can prevent the temporary switching of the occupant determination state from the "no-occupant" to the "occupant-being" by the swinging of a vehicle. Then the "occupant-being" determination state continues during within a predetermined time C (a predetermined time) after the time "T3".

While the "occupant-being" determination state continues within the predetermined time C, when the load detection value Ws exceeds the determination threshold Wth at time "T4", the CPU 26 starts clocking of elapsing time under the load detection value Ws being the, determination threshold Wth or more. When the elapsing time exceeds a second predetermined time D (a certain delaying time) as a second delaying time, the CPU 26 switches the occupant determination state from the "occupant-being" to the "adult". The second predetermined time D is applied to delaying transaction corresponding to the determination threshold Wth. The second predetermined time D is set to be a suitable value which can prevent the temporary switching of the occupant determination state from the "occupant-being" to the "adult" by the swinging or the posture variation of the occupant. In this case, since the occupant determination state is switched from the "occupant-being" to the "adult" during the "occupant-being" determination state, that is, the occupant having got in the vehicle apparently corresponds to the "adult" by judging from increase of the load detection value Ws in relatively short time, a result of the occupant determination is more-reliable. Consequently, the second predetermined time D is set shorter than the first predetermined time A. Then the occupant determination state being the "adult" continues after the time "T4"+D.

Further, in FIG. 7, after the load detection value Ws exceeds the determination threshold Wn1 at time "T5", the CPU 26 switches the occupant determination state from the "no-occupant" to the "occupant-being" at time "T6" (=T5+B) when the predetermined time B elapses under the load detection value Ws being the determination threshold Wn1 or more. Then the "occupant-being" determination state continues during within the predetermined time C after the time "T6". As shown in FIG. 7, if the load detection value Ws does not exceed the determination threshold Wth during the predetermined time C, the CPU 26 switches the occupant determination state from the "occupant-being" to the "child" at the time "T6"+C. Then the determination state being the "child" continues after the time "T6"+C.

Figure 8:
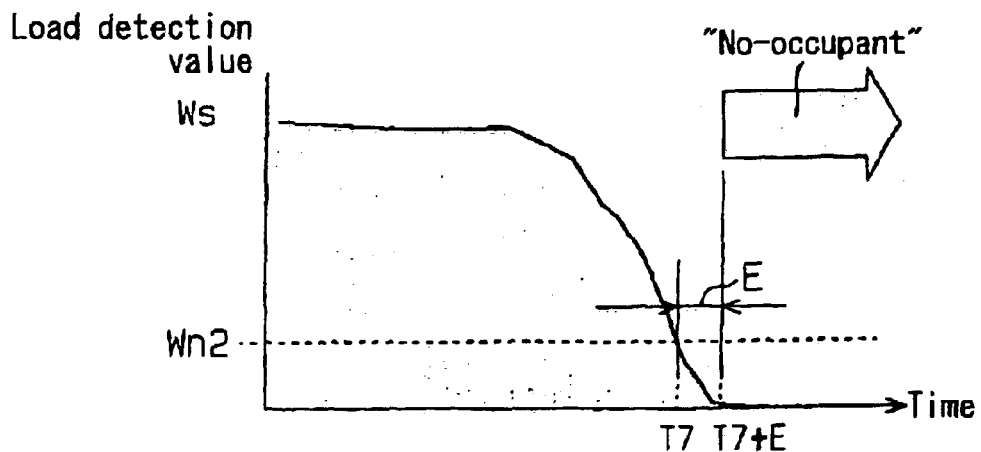
FIG. 8 is one of the time charts describing the occupant determination performed in the embodiment of the present invention.

Additionally, with reference to FIG. 8, transition of the occupant determination state will be explained as the occupant determination state corresponds to except the "no-occupant" under the load detection value Ws being larger than the determination threshold Wn2. In FIG. 8, when the load detection value Ws becomes smaller than the determination threshold Wn2 at time "T7", the CPU 26 starts clocking of elapsing time under the load detection value Ws being smaller than the determination threshold Wn2. Then the CPU 26 switches the occupant determination state from except the "no-occupant" to the "no-occupant" at the time "T7"+E after a predetermined time E elapses. The second predetermined time E is applied to delaying transaction corresponding to the determination threshold Wn2. The predetermined time E is set to be a suitable time which can prevent the temporary switching of the occupant determination state from except the "no-occupant" to the "no-occupant" by the swinging of the vehicle. Then the occupant determination state being the "no-occupant" continues after the time "T7"+E.

As explained above, according to the embodiment of the present invention, when the load detection value Ws exceeds the determination threshold Wn1, the occupant determination state is switched to the "occupant-being" during within the predetermined time C. During the "occupant-being" determination state that is, when the occupant including the "child" newly got in the vehicle if the load detection value Ws exceeds the determination threshold Wth, this variation of the load detection value Ws can be regarded as transition of the load detection value Ws corresponding to increase of the load detection value Ws as the occupant (the "adult") gets in the vehicle. Thus, when the occupant apparently corresponding to the "adult" gets in the vehicle, the occupant can be immediately determined as the "adult" in the delaying time which is set shorter.

In the embodiment, the occupant determination state corresponding to the "occupant-being" is provided. Thus, in a system such as a belt warning system, when the system need to inform whether or not the occupant is on the vehicle as soon as the occupant gets in the vehicle, the system can inform whether or not the occupant is on the vehicle based on the "occupant-being" determination state before the occupant determination state ("adult" or "child") is fixed. Additionally, in the belt warning system, special sensors for detecting the occupant are not necessary since the load detecting sensors 21–24 can be applied as the sensors for detecting the occupant.

Further, in the embodiment, the determination threshold Wn2 is set smaller than the determination threshold Wn1. Thus, when the weight of the occupant (the "child") is approximate to the determination threshold Wn1, the occupant determination state cannot be easily switched to the "no-occupant" even if the posture of the occupant (the "child") varies.

Furthermore, in the embodiment, the delaying time corresponding to each determination threshold is provided. Thus, frequent switching of the occupant determination state, which is generated by the temporary load variation being concurrent with traveling of the vehicle, can be prevented.

Of course, an embodiment of the present invention does not limited to the above-described embodiment.

According to the above-described embodiment, the determination threshold Wn1 is different from the determination threshold Wn2. However, both determination thresholds may be same.

In the embodiment, pair of the load detecting sensors 21 and 22 is provided at front portions of the seat body 1, and pair of the load detecting sensors 23 and 24 is provided at rear portions of the seat body 1. However, the foregoing number of the sensors and position of each sensor are one of the examples. Therefore, single load detecting sensor may be provided at a predetermined position of the seat body 1 or plural load detecting sensors may be provided at predetermined positions of the seat body 1 so that the occupant sitting on the seat body 1 can be determined based on a load detection value calculated by a detected value of the single load detecting sensor or plural detected values of the plural load detecting sensors.

The shape of sensor brackets 7 and 8 according to the embodiment is one of the examples. Any shape may be applied to the brackets 7 and a as far as flexure is generated on the brackets 7 and 8 in response to a sitting load.

The mounting positions of the load detecting sensors 21–24 are one of the examples. Any position can be arbitrary as far as the sitting load can be detected.

The seat body 1 according to the embodiment is applied as the passenger seat. However, the seat body 1 may be applied as a driver seat.

The principles, preferred embodiments and mode of operation of the present invention have been described in the foregoing specification. However, the invention which is intended to be protected is not to be construed as limited to the particular embodiments disclosed. Further, the embodiments described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. An occupant determining device, comprising:

a load detecting sensor provided on a seat body; and a controller calculating a detected load value based on an output value of the load detecting sensor and performing occupant determination based on the detected load value, wherein the occupant determination state is switched to an adult determination state when a certain delaying time elapses after the detected load value exceeds a first determination threshold, wherein the controller sets the delaying time shorter when the detected load value exceeds the first determination threshold within a predetermined time after the detected load value exceeds a second determination threshold.

2. An occupant determining device, according to claim 1, wherein a first delaying time and a second delaying time being shorter than the first delaying time are provided as the delaying time, the controller sets the first delaying time as the delaying time when the detected load value exceeds the first determination threshold after elapsing of the predetermined time under the detected load value exceeding the second determination threshold, and the controller sets the second delaying time as the delaying time when the detected load value exceeds the first determination threshold within the predetermined time after the detected load value exceeds the second determination threshold.

3. An occupant determining device, comprising:

a load detecting sensor provided on a seat body; and a controller calculating a detected load value based on an output value of the load detecting sensor and performing occupant determination based on the detected load value, wherein the occupant determination state is switched to an adult determination state when a certain delaying time elapses after the detected load value exceeds a first determination threshold, wherein the occupant determination state is switched to an occupant-being determination state by the controller during within a predetermined time when the detected load value exceeds a second determination threshold, and the controller sets the delaying time shorter when the detected load value exceeds the first determination threshold under the occupant-being determination state.

4. An occupant determining device, according to claim 3, wherein the occupant determination state is switched to a child determination state by the controller when the detected load value does not exceed the first determination threshold under the occupant-being determination state.

* * * * *